US005083004A

United States Patent [19]

Wells et al.

[11] Patent Number: 5,083,004

[45] Date of Patent: Jan. 21, 1992

[54] SPECTROSCOPIC PLASMA TORCH FOR MICROWAVE INDUCED PLASMAS

[75] Inventors: Gregory J. Wells, Suisun; Barbara A. Bolton, Albany, both of Calif.

[73] Assignee: Varian Associates, Inc., Palo Alto, Calif.

[21] Appl. No.: 349,205

[22] Filed: May 9, 1989

[51] Int. Cl.[5] .......... B23K 9/00

[52] U.S. Cl. .......... 219/121.5; 219/121.52; 219/121.51; 315/111.51

[58] Field of Search .......... 219/121.48, 121.5, 121.52, 219/75, 121.4, 121.51; 315/111.21, 111.31, 111.51; 313/231.31, 231.41; 356/346, 316

[56] References Cited

U.S. PATENT DOCUMENTS

| | | | |
|---|---|---|---|
| Re. 29,304 | 7/1977 | Greenfield et al. | 219/121.52 |
| 3,450,926 | 6/1969 | Kiernan | 219/121.5 |
| 3,562,486 | 5/1969 | Hatch | 219/130 |
| 3,892,882 | 4/1975 | Guest et al. | 427/34 |
| 3,973,186 | 8/1976 | Uehara et al. | 324/58.5 |
| 4,060,708 | 11/1977 | Walters | 219/75 |
| 4,101,411 | 7/1978 | Suzuki et al. | 219/121.52 |
| 4,225,235 | 9/1980 | Anderson et al. | 356/316 |
| 4,390,772 | 6/1983 | Hiratake | 219/121.51 |
| 4,482,246 | 11/1984 | Meyer et al. | 219/121.48 |
| 4,551,609 | 11/1985 | Falk | 219/121.52 |
| 4,586,368 | 5/1986 | Rice et al. | 356/311 |
| 4,609,808 | 9/1986 | Bloyet et al. | 219/121.52 |
| 4,659,899 | 4/1987 | Welkie et al. | 219/121.49 |
| 4,766,287 | 8/1988 | Morrisroe et al. | 219/121.52 |
| 4,833,294 | 5/1989 | Montaser et al. | 219/121.52 |

OTHER PUBLICATIONS

Bollo-Kamara, A. and Codding, E. G., "Considerations in the design of a mirowave induced plasma utilizing the $TM_{010}$ cavity for optical emission spectroscopy", *Spectrochimica Acta,* vol. 36B, No. 10, pp. 973-982. 1981.

K. S. Brenner, "Practical Experience with a Microwave Plasma Dector: Limits of Measurement and Examples of Applications", *Journal of Chromatography,* 167 (1978), pp. 365-380.

Scott A. Estes, Peter C. Uden, & Ramon M. Barnes, "High-Resolution Gas Chromatography of Trialkyllead Chlorides with an Inert Solvent Venting Interface for Microwave Excited Helium Plasma Detection", Anal. Chem., 1981, 53, 1336-1340.

John W. Carnahan, "Microwave Induced Plasma: A Versatile Spectroscopic Source", *American Laboratory,* Aug. 1983, pp. 31-36.

"HP 5921A Atomic Emission Detector", GC-AED Brochure Analysis, Michael Free and Lindy Miller, HP5921A Atomic Emission Detector, press release circa 01/09/89.

"HP Introduces First Benchtop Atomic-Emission Detector", press release circa 01/09/89.

*Primary Examiner*—Mark H. Paschall
*Attorney, Agent, or Firm*—Peter J. Sgarbossa

[57] ABSTRACT

A spectroscopic plasma torch suitable for use at atmospheric pressure is disclosed. The torch utilizes a microwave induced helium plasma confined in a plasma discharge tube. The plasma is suspended and stabilized by a vortex flow of helium. The torch includes a high velocity gas jet for introducing sample materials into the plasma. The design avoids the formation of carbon deposits in the plasma discharge tube caused by the premature pyrolysis of organic materials outside the plasma and prevents other sample materials from being adsorbed on the surface of the plasma tube. Because of these characteristics, the torch is particularly well suited for use as a component in a gas chromatography detector which employs helium as the plasma support gas.

18 Claims, 4 Drawing Sheets

SPECTROSCOPIC PLASMA TORCH FOR MICROWAVE INDUCED PLASMAS

FIELD OF THE INVENTION

The present invention relates generally to plasma torches of the type intended to operate at atmospheric pressure and which are suitable for use with analytical spectrometers for the analysis of gaseous materials. More particularly, the invention relates to those torches in which the plasma is induced with microwave energy. The invention is very well suited for use as a component in a gas chromatography detector which employs helium as the plasma support gas.

DESCRIPTION OF THE PRIOR ART

Plasma torches known in the prior art which are suitable for use in spectroscopic applications can be divided into two broad categories depending on the physical mechanism used to induce a plasma in the support gas. Both categories of torches employ some form of dielectric plasma tube to confine the plasma and, in theory, both categories can be designed to induce plasma in support gases such as air, nitrogen, argon and helium. Certain non-metallic atom species which are of interest to gas chromatographers and include, for example, chlorine, bromine, iodine, carbon and sulfur, can only be effectively excited by a helium plasma. In some designs, the plasma support gas moves with laminar flow through a small diameter discharge tube. In other designs, the support gas travels through a somewhat larger diameter discharge tube with a swirling, vortex flow.

The first broad category of torches are those which employ inductively coupled plasmas (ICP) and are currently in widespread commercial use in spectroscopic applications. Such torches typically can be made to operate with less than 1 kilowatt of power at frequencies less than 500 MHz (typically 27.2 MHz) with support gases such as argon, air or nitrogen. However, as noted above, gas chromatography generally requires use of helium as the support gas and so the ICP has not gained use in gas chromatography detectors. Very little work has been done with helium in an ICP. In order to form a helium ICP, several kilowatts of power are generally required. This is because the magnetically induced electric field within the plasma discharge tube is zero along the axis of the tube and remains so over much of the region between the axis and the interior wall, rising quickly to a finite value at the wall. This electric field configuration results in most of the energy being absorbed by the helium near the wall of the plasma tube and the higher thermoconductivity and electron mobility of helium compared to either argon, nitrogen or air causes a greater energy loss for a helium ICP, thus necessitating the use of higher powers to overcome this loss. Due to the lower gas viscosity of helium, relative to either argon, nitrogen or air, it is also more difficult to form a vortex stabilized plasma when using helium in a conventional ICP torch. Typically, a very high flow rate of helium must be used at several kilowatts of power to induce a vortex stabilized helium ICP.

In recent years, interest has developed in another category of plasma torches, i.e., microwave induced plasma (MIP) torches. In these designs, the longitudinal axis of the plasma discharge tube is shared with the axis of symmetry of a microwave cavity. Application of a few hundred watts of power at frequencies in excess of 1000 MHz (typically 2450 MHz) generate an oscillating electric field along the axis of symmetry of both the torch and the microwave cavity. As a result, the region along the axis has the greatest plasma density and thus absorbs the most power from the field. Both laminar and vortex support gas flows can be used with MIP torches. A description of a vortex stabilized MIP torch is contained in an article by A. Bollo-Kamara and E. G. Codding entitled: "Considerations in the Design of a Microwave Induced Plasma Utilizing the $TM_{010}$ Cavity for Optical Emission Spectroscopy", Spectrochimica Acta, Vol. 36B, No. 10, pp. 973–982, 1981, the disclosure of which is incorporated by reference herein.

All of the prior art ICP and MIP torches intended for spectrographic applications involving gas chromatography suffer from the accretion of carbon deposits along the walls of their associated plasma discharge tubes when organic compounds are present. These deposits form when organic sample materials undergo premature thermal pyrolysis in the high temperature region of the support gas prior to entering the plasma. If not removed, such carbon deposits will lead to the extinguishment of the plasma caused by the electrical shunting of the cavity due to the conductivity of the carbon. In MIP type torches, it is common in the prior art to allow the sample to enter the plasma by mixing it with the support gas which then enters the plasma by simple diffusion. Although carbon deposits are a problem with vortex plasma torches, when laminar flow discharge tubes are employed, the problem of carbon deposits may be so severe when a solvent peak elutes from a gas chromatograph, that special care must be taken to vent the solvent peak to prevent it from entering the plasma torch. The formation of undesired carbon deposits has been partially avoided in prior art plasma torches by adding a scavenging gas such as hydrogen or oxygen to the plasma support gas in order to chemically remove the deposits. This approach, however, prevents the simultaneous detection of oxygen and hydrogen since one of them must be present to scavenge the carbon. These problems are accentuated when the concentration of oxygen impurities is made less than 1 ppm, such as in the case of specifically analyzing for oxygen, where the support gas has been filtered to remove oxygen.

The vortex forming structure described by Messrs. Bollo-Kamara and Codding (containing only two helical gas channels) does not fit snugly within the plasma discharge tube and exhibits the disadvantage of allowing some of the plasma support gas to flow axially along the plasma tube. This results in a disruption of the vortex and hence reduces the stability of the plasma. This is particularly a problem when a large amount of an organic compound enters the plasma, such as when the solvent peak elutes from a gas chromatograph.

SUMMARY OF THE INVENTION

The present invention extends the performance capability of spectroscopic plasma torches for microwave induced plasmas known in the prior art. It does so by employing a housing possessing a microwave cavity symmetrically disposed about the axis of an aperture extending through the housing. A dielectric plasma discharge tube is disposed coaxial with the aperture in the housing and extends through the microwave cavity which is coupled to a source of microwave power. A torch body is attached to one end of the plasma discharge tube, the body possesses an end bore juxtaposed in coaxial alignment with the discharge tube. A source of plasma support gas is in fluid communication with the end bore in the torch body and vortex means are disposed in the end bore for inducing vortex gas flow in the plasma discharge tube to suspend and stabilize a plasma about portions of the longitudinal axis and away from the interior wall of the discharge tube during the operation of the torch. A high velocity gas jet means is connected to the torch body and extends beyond the vortex means for introducing gaseous sample materials directly into the vortex stabilized plasma to avoid the formation of carbon deposits in the plasma discharge tube caused by the premature thermal pyrolysis of selected sample materials outside the plasma.

Accordingly, an object of the present invention is to provide a new and improved spectroscopic plasma torch for microwave induced plasmas.

Another object of the invention is to provide a spectroscopic plasma torch which prevents the formation of carbon deposits and sample adsorption on the wall of the plasma tube.

Another object of the invention is to provide a new and improved vortex flow for the plasma support gas which functions to suspend and stabilize the plasma about portions of the longitudinal axis of the discharge tube.

Another object of the present invention is to provide a new and improved spectroscopic plasma torch which does not require the use of scavenger gases.

Yet still another object of the invention is to provide a spectroscopic plasma torch capable of simultaneously detecting carbon, hydrogen and oxygen.

Still another object of the invention is to provide a spectroscopic plasma torch with a high velocity gas jet for introducing gaseous sample materials directly into a vortex stabilized plasma to prevent the formation of carbon deposits, improve stability when a solvent peak from the output of a gas chromatograph enters the plasma and to improve sample sensitivity and selectivity.

The novel features that are considered characteristic of this invention are set forth with particularity in the appended claims.

BRIEF DESCRIPTION OF THE DRAWINGS

The many objects and advantages of the present invention will become apparent to those skilled in the art when the following description of the best mode contemplated for practicing the invention is read in conjunction with the accompanying drawings where in like reference characters refer to the same or similar elements and in which.

DETAILED DESCRIPTION OF THE PREFERRED EMBODIMENT

Figure 1:
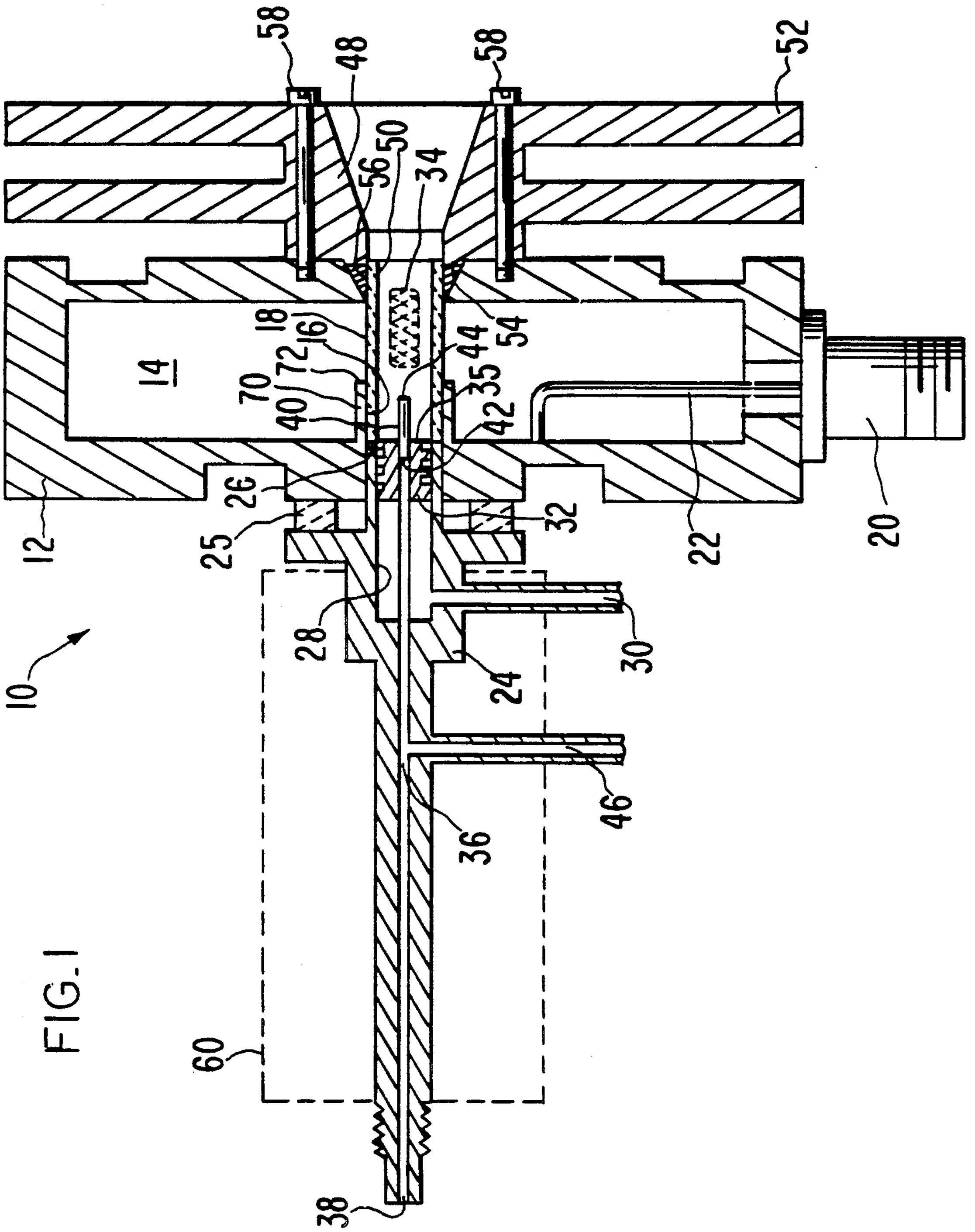
FIG. 1 is a cross sectional view of a spectroscopic plasma torch for microwave induced plasmas according to the invention.

Referring now generally to the several figures and more specifically to FIG. 1, there is shown in FIG. 1 a spectroscopic plasma torch 10. The torch 10 is formed with a microwave housing 12 which contains a microwave cavity 14 symmetrically disposed about an aperture 16 which extends through the housing 12. A dielectric, microwave permeable plasma discharge tube 18 extends through the aperture 12 and has its longitudinal axis coincident with the axis of symmetry for the cavity 14. The housing 12 is preferably both electrically and thermally conductive and may be formed from a metal such as aluminum. Quartz, alumina, boron nitride and beryllium are all suitable materials for the plasma discharge tube 18. A coaxial connector 20 and microwave coupling loop antenna 22 are used to couple a microwave power source to the cavity 14. A torch body 24 is attached to one end 26 of the plasma discharge tube 18. A thermal isolation washer 25 maintains portions of the torch body 24 in spaced apart relationship from the microwave housing 12. The torch body 24 possesses an end bore 28 which is juxtaposed in coaxial alignment with the longitudinal axis of the plasma discharge tube 18. A fluid passageway 30 connects the end bore 28 with a source of plasma support gas. Vortex means 32 are disposed in the end bore 28 downstream from the fluid passageway 30 for inducing vortex flow in the plasma support gas moving through the discharge tube to both suspend and stabilize a plasma 34 about portions of the longitudinal axis and away from the interior surface of the discharge tube 18. High velocity gas jet means 36 (see FIG. 3) are attached to the torch body 24 and extend beyond end 35 of the vortex means 32 as shown. The jet means 36 functions to introduce gaseous sample materials directly into the vortex stabilized plasma 34 thereby avoiding the formation of carbon deposits inside the plasma discharge tube 18 caused by the premature thermal pyrolysis of organic sample materials outside of the plasma. A fluid passageway 38 connects the gas jet means 36 to a source of gaseous sample materials such as, for example, the output from a gas chromatograph. The gas jet means 36 includes a hollow, elongate nozzle 40 formed of a dielectric material such as, for example, alumina, beryllia, boron nitride or quartz. The nozzle 40 possesses a first end 42 and a second end 44. The first end 42 of the nozzle 40 is connected to a source of jet gas through a fluid passageway 46. The flow rate of jet gas through the passageway 46 is selected to provide the optimum velocity for injecting sample materials into the plasma 34. Typically the jet gas, the plasma support gas and the carrier gas used to transport and separate sample materials in a chromatographic column are the same type of gas. Preferably that gas is ultrapure helium.

Heat sink means 48 are shown in thermal communication with the other end 50 of the plasma discharge tube 18. Although such heat sink means 48 are shown in FIG. 1 as a metal cooling fin 52, it is to be understood that other means, such as, for example, a water cooled jacket (not shown) could be satisfactorily employed. In the FIG. 1 embodiment, a graphite ferrule 54 is interposed between exterior portions 56 of the plasma discharge tube 18 proximate the other end 50 and portions of the metallic cooling fin 52 to enhance thermal transfer. Threaded fasteners 58 are used to both secure the cooling fin 52 to the microwave housing 12 and compress the graphite ferrule 54 into conformance with portions of the tube 18. In order to prevent condensation of gaseous sample materials in portions of the torch body 24, heating means, which are shown schematically as element 60, may be provided. The heating means may, for example, comprise an infrared heat lamp (not shown), a length of electrical heater tape wrapped around the torch body (not shown), or preferably a metal housing which provides a thermal mass adapted to receive portions of the torch body 24 and an electric cartridge heater (both not shown).

Figure 2A:
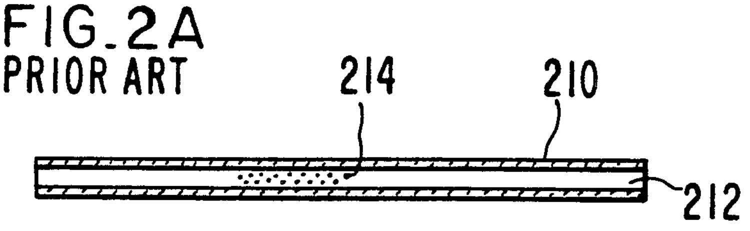
FIG.2A PRIOR ART
FIG. 2A is a cross sectional view of a capillary type prior art plasma discharge tube.

Referring now to FIG. 2A, there is shown in cross-section a prior art capillary type dielectric plasma discharge tube 210 made from fused quartz. The tube possesses an internal bore 212 typically less than 2 mm in diameter. A plasma 214 may be formed in the capillary tube either through inductive coupling or induced with microwaves. Because the plasma support gas moves with laminar flow through the internal bore 212, the plasma is in direct contact with portions of the interior surface of the tube. Because of the high temperatures generated by the plasma, it is necessary to surround the capillary tube with cooling means, such as, for example, a water jacket (not shown).

Figure 2B:
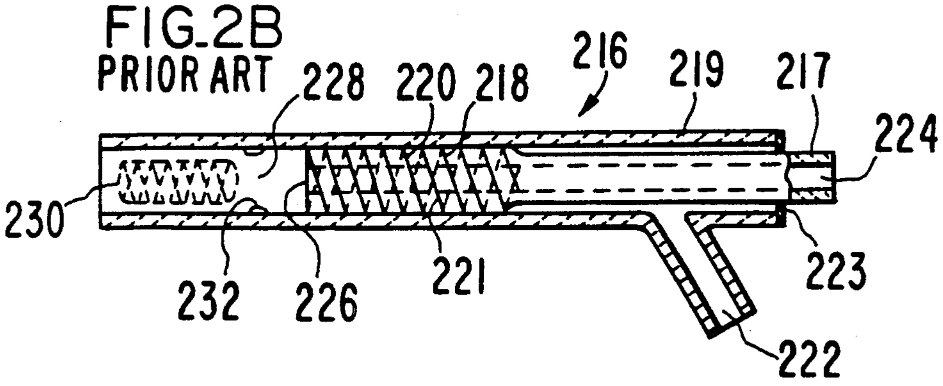
FIG.2B PRIOR ART
FIG. 2B is a cross sectional view of a vortex flow type prior art plasma discharge tube.

FIG. 2B is a cross-sectional view of the prior art vortex flow type plasma discharge tube 216 which is fabricated entirely from fused quartz and disclosed in the Bollo-Kamara and Codding article. It is noted that this torch was not used in conjunction with a gas chromatograph. Rather an aerosol was created and introduced into the plasma. A concentric tube arrangement is employed for torch construction. An inner quartz tube 217 possesses a pair of helical threads formed in a larger diameter end portion 218. A concentric outer quartz tube 219 is heat shrunk around the threaded end portion 218 of the inner quartz tube 217 to form first and second helical gas passageways 220 and 221 respectively. Special care must be taken to seal these passageways and avoid an axial gas flow between the concentric tubes. A seal 223 is formed around the annular gap between inner tube 217 and outer tube 219. A fluid passageway 222 is provided for a plasma support gas. A fluid passageway 224 in the inner tube 217 is used for the introduction of an analyte aerosol. The passageway 224 does not extend beyond the end of the double threaded end portion 218 but is co-terminus therewith at an end surface 226. An aerosol mixing region 228 is positioned upstream from a plasma 230. Even if scavenging gases are used, carbon deposits 232 tend to form on the inner surface of the discharge tube because organic analytes have a tendency to undergo premature thermal pyrolysis before they enter the plasma 230. Other prior art vortex type plasma discharge tubes are known in which the inner tube 217 has been fabricated from either brass or polytetrafluorethylene. These known prior art tubes are not believed to have employed more than two helical passageways to induce a vortex gas flow.

Figure 3:
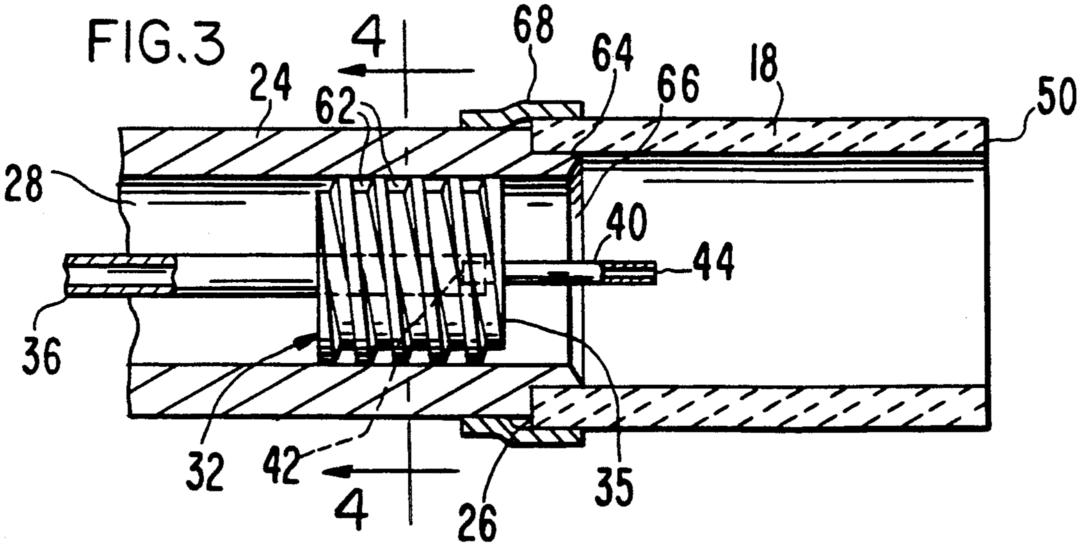
FIG. 3 is an enlarged, partially broken away phantom view of the vortex means and high velocity gas jet means shown in the plasma torch of FIG. 1.

FIG. 3 provides an enlarged, partially broken away phantom view of one embodiment of the vortex means 32 and the high velocity gas jet means 36 shown in somewhat less detail in FIG. 1. In particular, the dielectric plasma discharge tube 18 is shown with the one end 26 assembled on the torch body 24 so as to form an overlapping joint 64. In this embodiment, the end bore 28 is of smaller diameter than the inside diameter of the discharge tube 18. The end bore 28 has an outwardly tapered transition region 66 which prevents the formation of unwanted turbulence in the tangentially flowing plasma support gas as it moves from a smaller to a larger cross-sectional area. Those skilled in the art will appreciate that a design in which the diameter of the end bore is larger than the inside diameter of the discharge tube 18 will give rise to some unwanted turbulence. It is to be understood that a tapered transition region 66 can be avoided altogether by configuring the inside diameter of the discharge tube 18 to be the same as and contiguous with the end bore 28. In the FIG. 3 embodiment, a metal coupling 68 is used to secure the plasma discharge tube 18 to the torch body 24. The coupling 68 may be brazed in place to form a permanent assembly. Alternatively, the coupling 68 may function simply as a spring retention clip since a hermetic seal is not required to prevent undesirable perturbations to the plasma.

Figure 4:
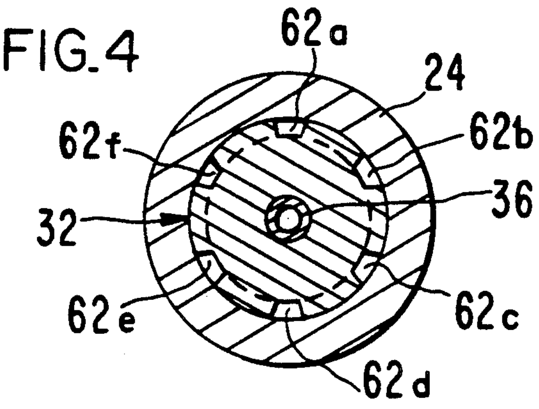
FIG. 4 is a cross sectional view of a six-channel vortex insert as seen through the lines 4—4 of FIG. 3.

The design of the FIG. 3 embodiment has been optimized for use with helium as the plasma support gas. As such, the associated microwave cavity 14 has an axial length of 18 mm and possess a reentrant flange portion 70 as can be seen in FIG. 1. The reentrant flange portion 70 is 8 mm in length and possesses an annular lip 72. In the FIG. 3 embodiment, the vortex means 32 comprises a metal insert with six equally spaced helical grooves. Although selected other materials may be employed, the use of metal for the vortex insert and the torch body 24 is preferred to facilitate the maintenance of close dimensional tolerances. When the grooved insert is assembled in the bore 28 of the torch body 24, a plurality of helical plasma support gas channels 62 are formed. The arrangement of these channels is shown in FIG. 4 which is a cross-sectional view of the six channel vortex insert as seen through the lines 4—4 of FIG. 3. In this view, the individual gas channels 62*a*, 62*b*, 62*c*, 62*d*, 62*e*, and 62*f* are shown uniformly spaced about the periphery of the vortex insert. Developmental experiments have indicated that prior art vortex producing structures which possess only two helical gas support channels are not adequate to suspend and stabilize a helium plasma which would be suitable for use in a commercially viable analytical instrument designed to detect plasma emission spectra. For such applications, at least four helical plasma gas support channels 62 are considered necessary. Dimensional constraints limit the maximum number of helical gas channels to about 9. In the FIG. 3 embodiment, each of the 6 individual gas channels is disposed at a helix angle (measured from the central axis) of between 60° and 85°. These values have been determined for use with a discharge tube 18 having a 6 mm inside diameter and a helium plasma support gas flow of from 2 to 6 liters per minute. These values also contemplate additional helium flow through the high velocity gas jet means 36 of about 100 ml per minute.

The use of the high velocity gas jet means 36 for introducing gaseous sample materials into the plasma prevents the sample from being diluted in the large flow of surrounding support gas. This increases the intensity of the resulting emission. The introduction of the sample from the jet means also prevents the formation of carbon deposits on the wall of the plasma tube prior to entering the plasma. The observation of carbon deposits is only a visual manifestation of a more general problem of sample deposits that accrue along the plasma tube. Materials that adsorb on the wall of the plasma tube can eventually leave and enter the plasma at a later time causing peak tailing of the chromatographic signal.

In the FIG. 3 embodiment, the nozzle 40 is made from alumina and has an inside diameter of 0.305 mm and an outside diameter of 0.711 mm. The second end 44 of the nozzle 40 extends 4 mm beyond the end surface 35 of the vortex means 32. With a typical helium jet flow rate of 100 ml per minute, the linear velocity of helium gas with this nozzle is approximately 2300 cm per second. It is noted for comparative purposes that a helium flow rate of 5 liters per minute through the plasma tube 18 with a 6 mm inside diameter results in an axial plasma support gas velocity of 294 cm per second. In the FIG. 3 embodiment, the end of the vortex means 35 is displaced linearly 6 mm upstream from the lip 72 on the reentrant flange 70. This arrangement results in a 2 mm upstream displacement of the second end 44 of the nozzle 40 from the lip 72. As shown in FIG. 1, the plasma 34 is induced just downstream of the lip 72.

Figure 5:
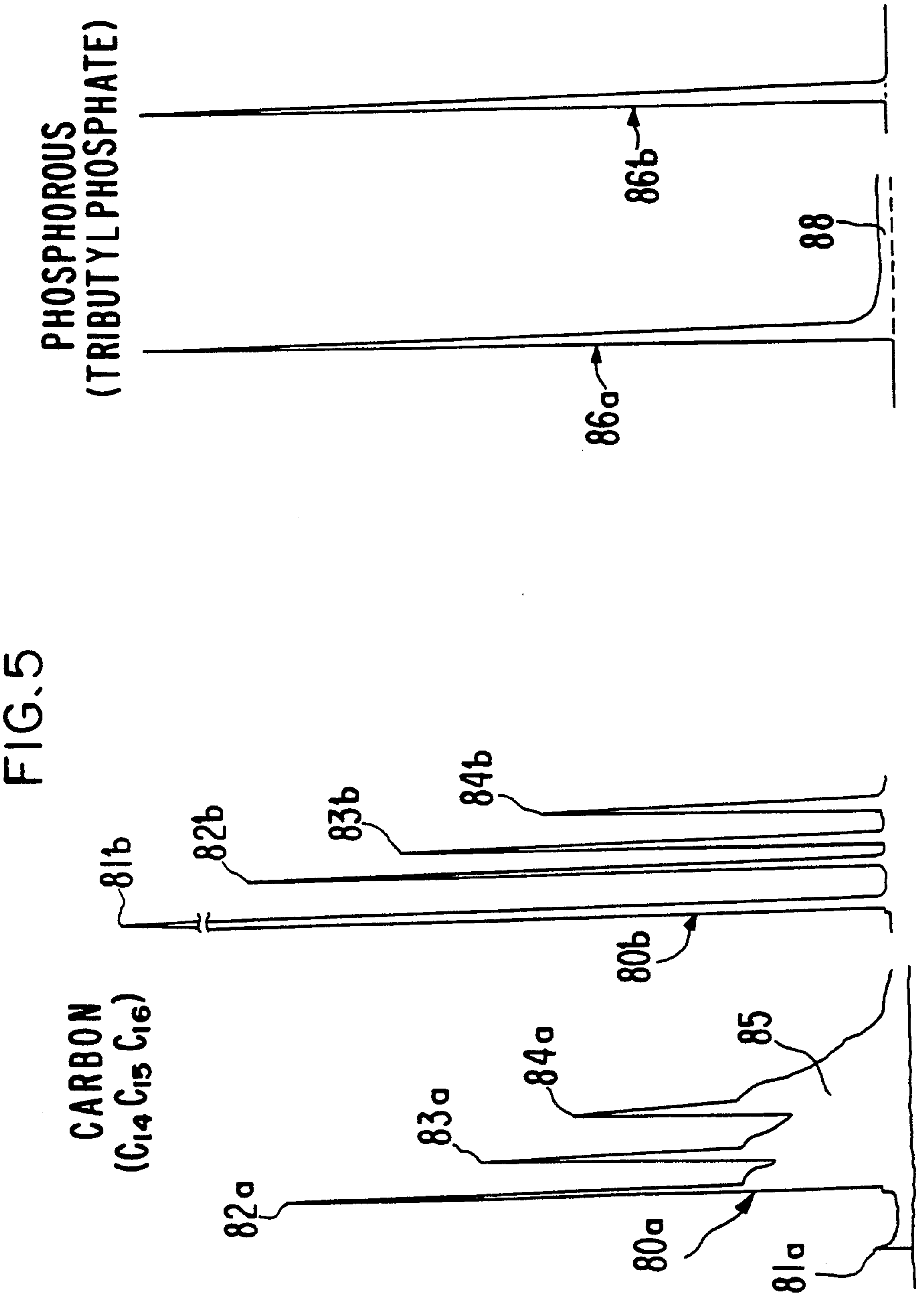
FIG. 5 shows four chromatograms which demonstrate the improvement in chromatographic selectivity made possible with the high velocity gas jet means.

FIG. 5 shows four chromatographs which demonstrate the improvement in chromatographic selectivity made possible with the high velocity gas jet means 36. The data was measured using a plasma torch in accordance with the FIG. 3 embodiment described above. Curve 80*a* is the chromatogram from the carbon channel of an analytical instrument for a mixture of three normal homologous alkanes: $C_{14}H_{30}$; $C_{15}H_{32}$; and $C_{16}H_{34}$ without the use of the high velocity gas jet means 36. Similarly, curve 80*b* is the chromatogram from the carbon channel of an analytical instrument for the same mixture of three normal homologous alkanes in which the plasma torch 10 is operated with the high velocity gas jet means 36. Peak 81*a* is associated with the organic sample solvent but is severely attenuated because the solvent extinguished the plasma. Only after the solvent passed through the plasma region could the plasma be reignited. Peaks 82*a*, 83*a* and 84*a* are associated respectively with the $C_{14}$, $C_{15}$, and $C_{16}$ alkanes. An area 85 under the three peaks indicates peak tailing from residual carbon deposits on the wall of the plasma discharge tube. When the gas jet means 36 is used in a detector the same mixture of alkanes, the solvent appears as a peak 81*b* and does not extinguish the plasma. Moreover, there is no residual carbon tailing. Peaks 82*b*, 83*b* and 84*b* again correspond respectively to the $C_{14}$, $C_{15}$, and $C_{16}$ alkanes. The high selectivity and absence of peak tailings provides graphic evidence of the improvements brought about by the invention. The same phenomenon can be observed less dramatically with other atomic species. For example, the curve 86,86*a* is the chromatograph from the phosphorus channel for tributylphosphate without the benefit of the high velocity gas jet means. A region 88 represents peak tailing and arises from the adsorption of phosphorus on the wall of the plasma discharge tube after the phosphorus sample has passed through the chromatographic column. When the gas jet means 36 is employed, no peak tailing appears beneath 86*b* because all of the phosphorus enters the plasma leaving no residual to be adsorbed on the wall of the plasma tube.

Figure 6:
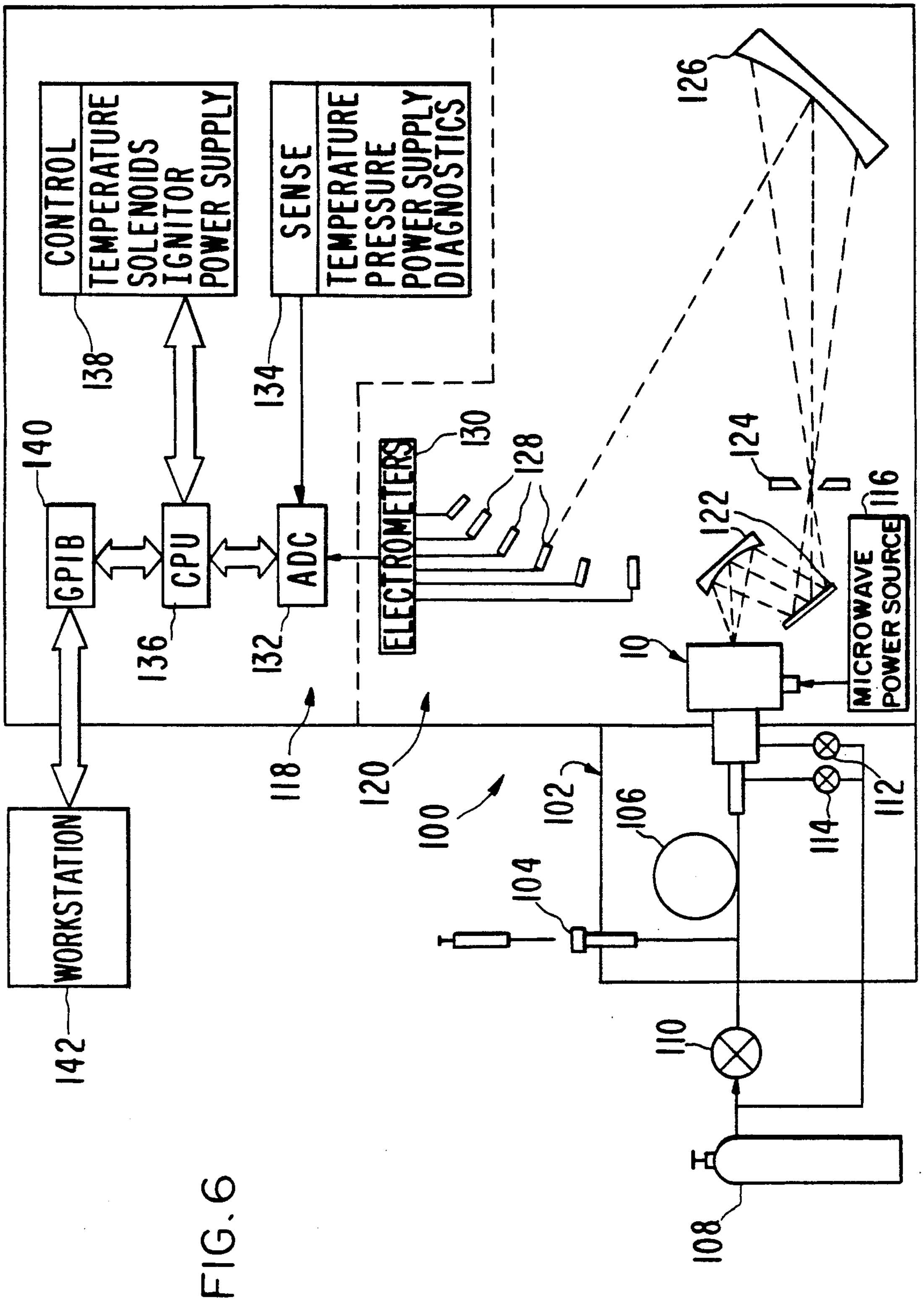
FIG. 6 is a schematic diagram of a plasma emission detector for gas chromatography which employs the spectroscopic plasma torch of the invention.

The spectroscopic plasma torch of the invention was specifically designed for use in a fully automated, bench top emission detector intended to analyze various compounds separated by a gas chromatograph. FIG. 6 is a schematic diagram of such a plasma emission detector for gas chromatography which employs the spectroscopic plasma torch of the invention. A complete analytical instrument 100 includes a gas chromatograph 102 which possesses an injection port 104 and a separation column 106. A tank of high purity helium gas 108 is connected to a gas flow controller 110 used to supply the carrier gas to the separation column 106. Another gas flow controller 112 regulates the plasma support gas to the torch 10. Still another gas flow controller 114 regulates the flow to the high velocity gas jet means. A microwave power source 116 is coupled to the torch 10. In this embodiment, a commercially available magnetron tube of the type commonly used in home microwave ovens provides a reliable, low cost source of the necessary microwave energy at a frequency of 2450 MHz. The analytical instrument 100 includes instrument support electronics 118 and optical spectrometer means 120. A pair of coupling mirrors 122 gather and focus the light from the plasma torch 10. That light is directed through an entrance slit 124 onto a holographic grating 126. A plurality of photodiode detectors 128 are disposed to detect selected spectral emissions from selected to-be-detected atomic species. A corresponding plurality of electrometers 130 are connected respectively to the plurality of diode detectors 128. Output from each electrometer is sampled 22 times a second and converted to a digital signal by an analog to digital convertor 132. Signals from an instrument monitoring sensor means 134 are also digitized at a similar sampling rate. Monitoring means 134 monitors temperatures, pressures, currents, voltages of various power supplies, interlock conditions and diagnostics. A central processing unit 136 communicates bi-directionally with the analog to digital converter 132, an instrument control means 138, and a general purpose instrument bus 140. The control means 138 functions to control various temperatures, gas solenoids, valves, plasma igniter and the power supply. The general purpose instrument bus 140 provides a bi-directional communication path to a workstation 142.

From the foregoing detailed description, it will be evident that there are a number of changes, adaptations and modifications of the present invention which come within the province of those skilled in the art. For example, although the plasma torch of the invention has been described as being formed in part by a torch body and a dielectric plasma discharge tube, it is to be understood that these components could be formed from an integral body of dielectric material. Accordingly, it is intended that all such variations not departing from the spirit of the invention be considered as within the scope thereof as limited solely by the appended claims.

What is claimed is:

1. A microwave induced plasma torch for use with a gas chromatograph comprising:

a dielectric, microwave permeable plasma discharge tube;

a source of microwave power coupled to said plasma discharge tube;

a torch body attached to one end of said plasma discharge tube, said body possessing an end bore juxtaposed in coaxial alignment with said plasma discharge tube;

a means to receive a plasma support gas that is in fluid communication with said end bore in the torch body;

a vortex means disposed within said end bore for inducing a vortex support gas flow in the plasma discharge tube positioned to suspend and stabilize a filamentary plasma about a portion of the longitudinal axis and away from the interior wall of said plasma discharge tube during the operation of the torch, said vortex means inducing a smooth, non-turbulent vortex support gas flow;

a substantially tubular gas jet means connected to the torch body and extending beyond the vortex means for introducing a sample from said gas chromatograph at a high velocity to a point proximate the plasma, whereby carbon deposition in the plasma discharge tube is minimized.

2. The spectroscopic plasma torch of claim 1 further comprising heater means in thermal communication with said torch body for preventing the condensation of said gaseous sample materials within said torch body.

3. The spectroscopic plasma torch of claim 1 wherein said vortex means comprises an insert disposed in close confirmation within portions of said end bore and configured to form at least four helical gas channels symmetrically arranged about the axis of said end bore.

4. The spectroscopic plasma torch of claim 2 wherein said heater means comprises an infrared heat lamp directed at said torch body.

5. The spectroscopic plasma torch of claim 2 wherein said heater means comprises a metal housing adapted to receive portions of said torch body and an electric cartridge heater.

6. The spectroscopic plasma torch of claim 2 wherein said heater means comprises electric heater tape wrapped about portions of said plasma torch.

7. The microwave induced plasma torch for use with a gas chromatograph of claim 1 wherein said gas jet means comprises:

a hollow, elongate, substantially tubular nozzle of dielectric material possessing a first end, disposed coaxially with a portion of said end bore in said torch body, and a second end, disposed within the plasma discharge tube, said first end being in fluid communication with a source of gaseous sample materials and said second end extending coaxially into the plasma discharge tube beyond the vortex means to a point proximate the plasma, the outer diameter of said nozzle being substantially smaller than said the diameter of said vortex means.

8. The microwave induced plasma torch for use with a gas chromatograph of claim 7 wherein said torch body and said vortex means are comprised of metal.

9. A microwave induced plasma torch for use with a gas chromatograph comprising:

a housing possessing a microwave cavity symmetrically disposed about the axis of an aperture extending through said housing;

a dielectric, microwave permeable plasma discharge tube disposed coaxially with said aperture and extending through said microwave cavity;

a dielectric, microwave permeable plasma discharge tube;

a source of microwave power coupled to said microwave cavity;

a torch body attached to one end of said plasma discharge tube, said body possessing an end bore juxtaposed in coaxial alignment with said plasma discharge tube;

a means to receive a plasma support gas that is in fluid communication with said end bore in the torch body;

a vortex means disposed within said end bore for inducing a vortex support gas flow in the plasma discharge tube positioned to suspend and stabilize a filamentary plasma about a portion of the longitudinal axis and away from the interior wall of said plasma discharge tube during the operation of the torch, said vortex means inducing a smooth, non-turbulent vortex support gas flow;

a substantially tubular gas jet means connected to the torch body and extending beyond the vortex means for introducing a sample from said gas chromatograph at a high velocity to a point proximate the plasma, whereby carbon deposition in the plasma discharge tube is minimized.

10. The microwave induced plasma torch for use with a gas chromatograph of claim 9 wherein said gas jet means comprises:

a hollow, elongate, substantially tubular nozzle of dielectric material possessing a first end, disposed coaxially with a portion of said end bore in said torch body, and a second end, disposed within the plasma discharge tube, said first end being in fluid communication with a source of sample materials and said second end extending coaxially into the plasma discharge tube beyond the vortex means to a point proximate the plasma, the outer diameter of said nozzle being substantially smaller than said the diameter of said vortex means.

11. The spectroscopic plasma torch of claim 10 wherein said gas jet means additionally comprises:

a source of helium jet gas in fluid communication with said first end of said nozzle to maintain an optimum gas flow rate and velocity for the introduction of said sample materials into the plasma.

12. The spectroscopic plasma torch of claim 9 wherein said vortex means comprises an insert disposed in close confirmation within portions of said end bore and configured to form at least four helical gas channels symmetrically arranged about the axis of said end bore.

13. The spectroscopic plasma torch of claim 9 further comprising heat sink means attached to portions of said plasma discharge tube proximate the other end for dissipating heat generated by said torch.

14. The spectroscopic plasma torch of claim 11 further comprising heater means in thermal communication with said torch body for preventing the condensation of said gaseous sample materials within said torch body.

15. The spectroscopic plasma torch of claim 9 wherein said source of sample materials comprises a gas chromatograph.

16. The spectroscopic plasma torch of claim 15 additionally comprising spectrometer means optically coupled to the helium plasma for detecting selected atomic spectra of sample materials.

17. The microwave induced plasma torch for use with a gas chromatograph of claim 10 wherein said torch body and said vortex means are comprised of metal.

18. The microwave induced plasma torch for use with a gas chromatograph of claim 9 wherein the aperture in said microwave cavity nearest said torch body is formed by an annular reentrant flange.

* * * * *